United States Patent [19]

Tuyn et al.

[11] Patent Number: 4,860,585

[45] Date of Patent: Aug. 29, 1989

[54] MEASURING AND INDICATING DEVICE FOR A SNOW SKIER

[76] Inventors: William W. Tuyn, 449 Lakewood Pkwy., Snyder, N.Y. 14226; Richard R. Tuyn, 14 Eagan Blvd., Rochester, N.Y. 14623

[21] Appl. No.: 140,581

[22] Filed: Jan. 4, 1988

[51] Int. Cl.[4] .................................................. G01P 3/16
[52] U.S. Cl. ........................................ 73/493; 73/490; 324/175
[58] Field of Search ............... 73/493, 490, 597, 491, 73/492; 324/175; 280/816

[56] References Cited

U.S. PATENT DOCUMENTS

| Re. 28,839 | 6/1976 | Overs | 73/187 |
|---|---|---|---|
| 3,505,878 | 4/1970 | Moll | 73/493 |
| 3,978,725 | 9/1976 | Hadtke | 73/182 |
| 4,007,419 | 2/1977 | Jasmine | 324/166 |
| 4,206,637 | 6/1980 | Pankonien | 73/187 |
| 4,262,537 | 4/1981 | Jander et al. | 73/493 |
| 4,352,063 | 9/1982 | Jones et al. | 324/171 |
| 4,546,650 | 10/1985 | Cameron | 73/493 |
| 4,757,714 | 7/1988 | Purdy et al. | 73/597 |

Primary Examiner—Stewart J. Levy
Assistant Examiner—Louis M. Arana
Attorney, Agent, or Firm—Christel, Bean & Linihan

[57] ABSTRACT

A measuring and indicating device for a snow skier including a rotatable roller attachable to the rear of a ski and adapted to rotate in rolling contact with the underlying snow utilizes an indicator unit positionable remote of the roller such as upon the wrist of the skier. The device further includes elements supported adjacent the roller for sensing the rotation thereof and generating signals corresponding to the sensed rotation. The indicator unit includes a calculator for receiving the signals generated by the sensing elements and calculating a predetermined characteristic, such as speed or distance, of travel by the snow skier corresponding to the received signals. The indicator unit further includes a display for displaying the calculated characteristic in the form of a numerical value. The device further includes a connecting mechanism interposed between the roller and the ski permitting pivotal movement of the roller between a raised and lowered condition in relation to the rear of the ski and a spring for biasing the roller from the raised condition to the lowered condition so that if the rear end of the ski were to be raised an appreciable distance above the surface of the snow, the roller is maintained in rolling engagement with the underlying snow for measurement calculations. The device is particularly well-suited for accurately measuring a predetermined characteristic of travel even if the ski is tipped upon one side or the other.

22 Claims, 3 Drawing Sheets

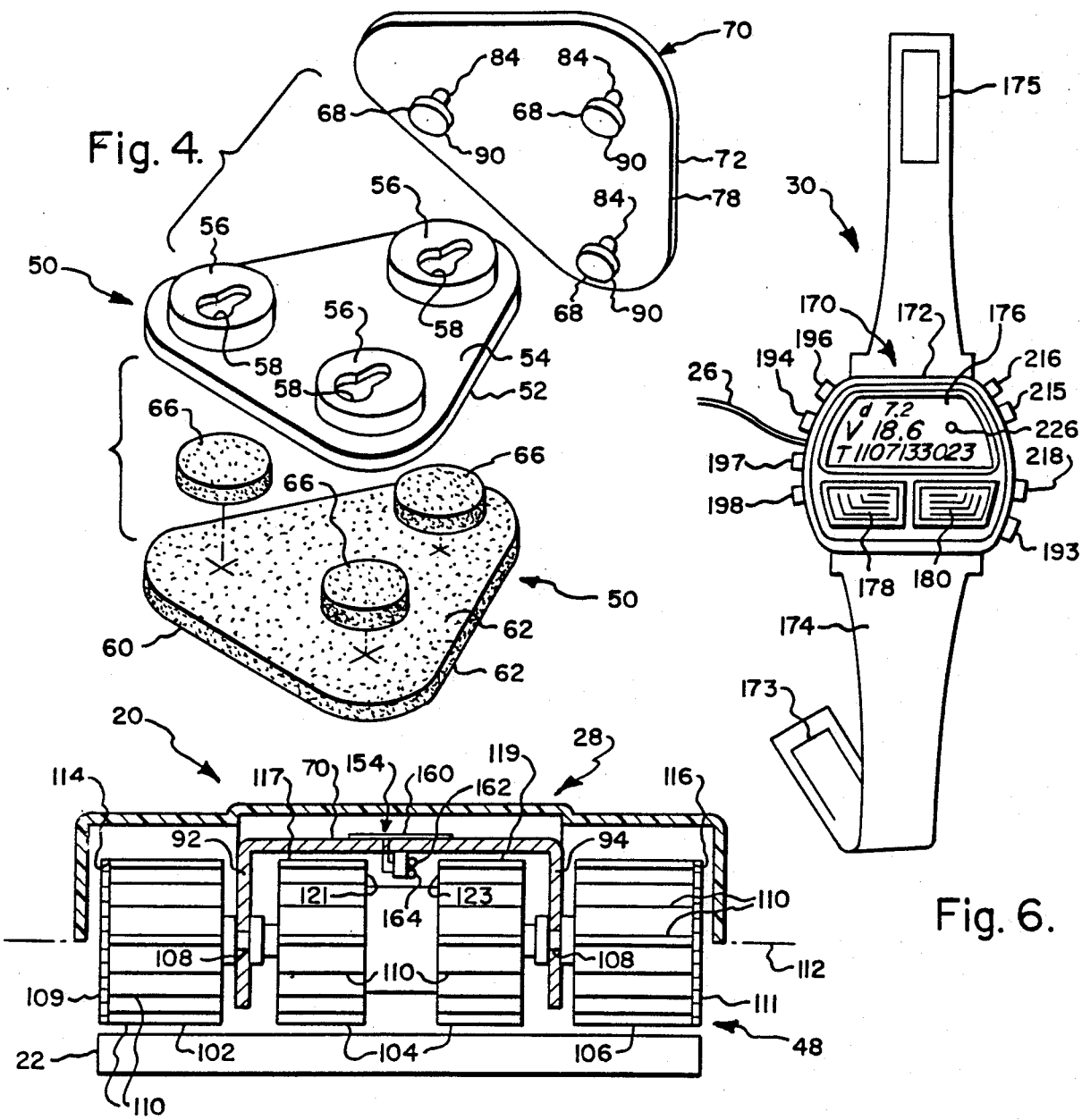

MEASURING AND INDICATING DEVICE FOR A SNOW SKIER

TECHNICAL FIELD

This invention relates generally to measuring and indicating devices for the rider of a vehicle, such a snow skier or the like, and relates more particularly to a device for providing a measured characteristic of travel, such as speed or distance, to the rider as he traverses across snow or another underlying surface.

BACKGROUND OF THE INVENTION

Prior art measuring and indicating devices commonly include support means adapted to be attached to a ski and a wheel rotatably supported by the support means so as to be positioned in rolling contact with snow underlying the ski. The wheel is thereby caused to rotate as the ski is moved across the underlying snow. These prior art devices also include indicating means associated with the wheel and responsive to the rotations thereof for calculating or measuring a predetermined characteristic of the skier's travel, such as speed or distance, as the ski moves across the snow. Furthermore, such devices also include display means associated with the indicator means for displaying the calculated characteristic. Examples of such devices are shown and described in U.S. Pat. No. 4,546,650, 3,505,878 and 4,262,537.

A limitation associated with devices such as those described in the referenced patents relate to the viewability by the skier of the calculated characteristic. For example, each device described in the referenced patents includes display means mounted directly to the ski thus requiring the skier to look down at his skis and away from his normal, or forwardly-directed, line of vision in order to observe the display means. If the skier is moving at a relatively high rate of speed for a period of time, any such observance of the display means during that period may be inconvenient or dangerous.

Furthermore, inasmuch as each device described in the referenced patents is carried directly by the skis to which the device is attached, each component of the device is exposed to shock effects associated with any jolting of the skis if, for example, the skis are moved rapidly across relatively rough terrain or otherwise suddenly strike the ground from an elevated condition. If the components of the device possess a low resistance to shock, damage to the components or a reduction in the useful life of the device is likely to result therefrom.

Another limitation associated with each device described in the referenced patents relates to its inability to accurately measure the predetermined characteristic of travel if the skier's skis occasionally move off of, or become elevated above the snow during use. Such an inability is believed to be due, at least in part, to the relatively rigid attachment of the rotatable wheel to the ski preventing the wheel from making contact with the snow when the ski is elevated thereabove. Unless, of course, the wheel makes rolling contact with the snow, the wheel will not rotate in accordance with the movement of the ski, and errors in the calculated characteristics are likely to result therefrom.

OBJECTS OF THE INVENTION

Accordingly, it is an object of the present invention to provide a new and improved measuring and indicating device for measuring a predetermined characteristic of travel by a snow skier and for displaying the measured characteristic in a fashion which can be observed by the skier in a safe and convenient manner.

Another object of the present invention is to provide such a device having preselected components which are not appreciably exposed to the shock commonly experienced by a ski as it moves across snow during use.

Still another object of the present invention is to provide such a device for accurately calculating the predetermined characteristic of travel by the snow skier even if his skis are occasionally elevated above the snow by an appreciable amount.

Yet still another object of the present invention is to provide such a device wherein the accuracy of a measured characteristic is not significantly effected by any tilting action of the ski to one side or the other relative to the underlying snow during use of the ski.

A further object of the present invention is to provide such a device wherein the accuracy of a measured characteristic is not adversely effected by the packed or icy condition of the underlying snow.

A still further object of the present invention is to provide such a device including memory means for storing measured characteristics of travel.

A yet still further object of the present invention is to provide such a device including a stop watch.

One more object of the present invention is to provide such a device including memory means for storing stop watch calculations.

Still one more object of the present invention is to provide such a device which is well-suited as a teaching device for skiers learning rhythm of movement.

Yet still one more object of the present invention is to provide such a device having wheel-supporting componentry which can be easily and quickly attached to or detached from the ski permitting use of the ski with or without the wheel-supporting componentry.

An additional object of the present invention is to provide such a device which is uncomplicated in structure yet effective in operation.

SUMMARY OF THE INVENTION

This invention resides in a measuring and indicating device for use by a rider of a vehicle such as a snow skier or the like to indicate to the rider a predetermined characteristic of the rider's travel, such as speed or distance, as the rider traverses an underlying surface.

More specifically, the present invention relates to indica means or indicating means which are adapted to be carried by the rider of the vehicle and measuring means which extend between the vehicle and the rider. The measuring means may include sensing and signal generating means mounted on the vehicle and calculating means associated with the indicating means.

The device includes support means adapted to be attached to a ski of the skier and sensing means associated with the support means for sensing relative movement between the ski and the underlying snow and generating signals corresponding to the sensed movement. The device further includes an indicating unit associated with the support means and positionable remote of the sensing means including calculator means for receiving the signals generated by the sensing means and calculating a predetermined characteristic of travel of the snow ski corresponding to the received signals. Informing means are associated with the calculator means for informing the skier of the calculated characteristic. Furthermore, the device includes means associated with the sensing means for sending the signals generated thereby to the calculator means.

In one embodiment of the device, the sensing means includes roller means connected to the support means for rotational movement relative thereto and supported by the support means so that when the support means is operatively attached to the ski and the ski is moved across the snow, the roller means rotates in rolling engagement with the snow. In such an embodiment, the sensing means senses the rotation of the roller means and generates signals corresponding to the sensed rotation.

BRIEF DESCRIPTION OF THE DRAWING FIGURES

FIG. 4 is a perspective view of a portion of the FIG. 3 componentry, shown exploded.

FIG. 5 is a cross-sectional view taken about on lines 5—5 of FIG. 2.

FIG. 6 is a perspective view of the wrist-mounted componentry of the FIG. 1 device.

DETAILED DESCRIPTION of AN ILLUSTRATED EMBODIMENT

Figure 1:
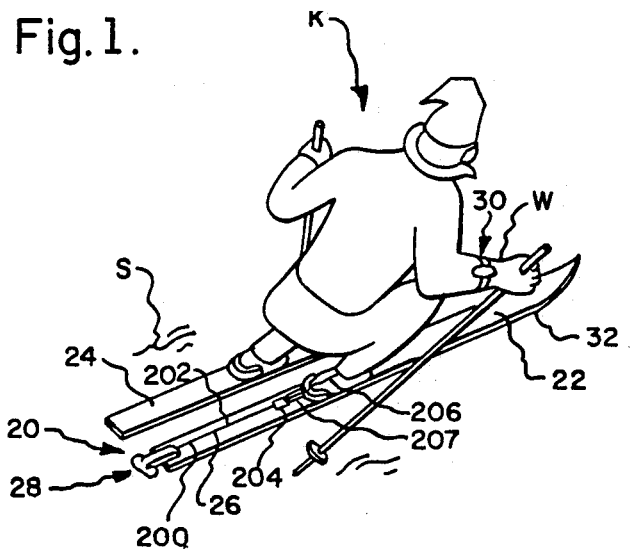
FIG. 1 is a perspective view of a skier having a ski to which an embodiment of a device in accordance with the present invention is connected and which illustrates an environment in which the present invention is utilized.

Turning now the drawings in greater detail and first FIG. 1, there is shown an embodiment of a device, generally indicated 20 and in accordance with the present invention, operatively associated with a skier, generally indicated K, shown moving across snow S on a pair of skis 22,24. The device 20 includes a ski-mounted unit 28 operatively attached to one ski 22 and a wrist-mounted unit 30 operatively attached to the wrist, indicated W, of the skier K. The units 28 and 30 are attached by means of a cable 26 and, as will be explained in greater detail hereinafter, the device 20 measures a predetermined characteristic of the skier's travel, such as speed of or distance traveled by the skier K, as he travels across the snow S and indicates the measured characteristic to the skier.

With reference to FIG. 1, the skis 22,24 each include a front end portion 32 and a rear end portion 34. As exemplified by the ski 22 of FIG. 2, the rear end portion 34 of the each ski 22 or 24 defines generally planar and parallel top and bottom surfaces 36 and 38, respectively, extending rearwardly of the ski so as to terminate in a back edge 40 Furthermore, the rear end portion 34 includes opposite side edges 42,44 extending between the top and bottom surfaces 36 and 38.

Figure 3:
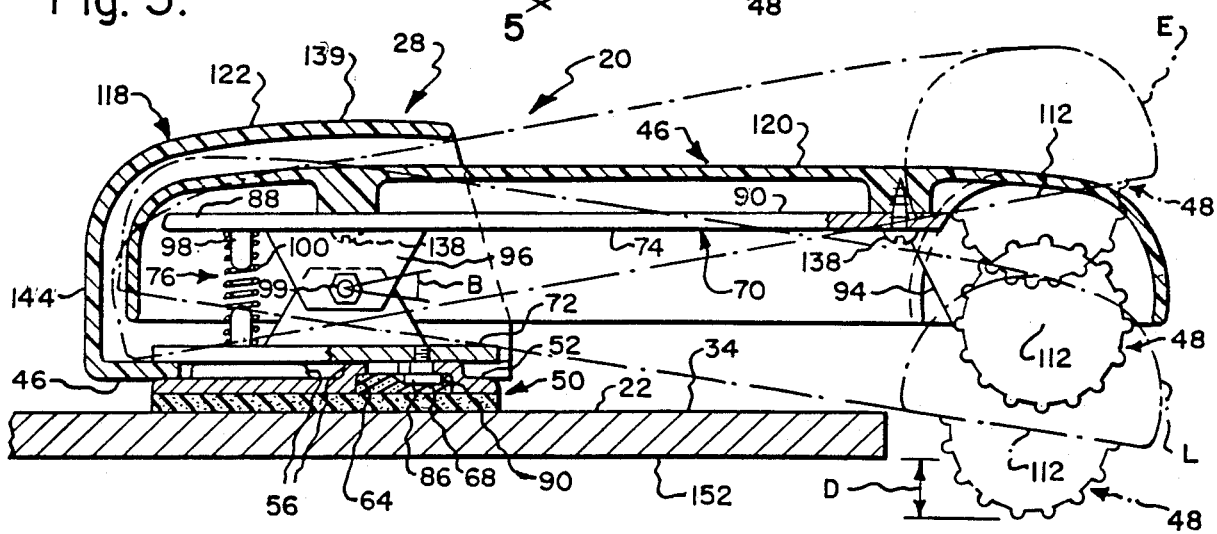
FIG. 3 is a cross-sectional view taken about on lines 3—3 of FIG. 2.

In accordance with the present invention, the ski-mounted unit 28 of the device 20 includes support means, indicated 46, and sensing means including roller or wheel means, indicated 48, journalably supported by the support means 46. The support means 46 is attachable to the ski 22 in a manner operatively supporting the roller means 4B adjacent the back edge 40 of the ski 22. With reference to FIG. 3, the support means 46 includes a base 50 for attachment of the remainder of the support means 46 to the ski 22. To this end and with reference to FIGS. 3 and 4, the base 50 includes a rigid plate member 52 including a substantially flat portion 54 and three raised portions 56 which are elevated in relationship to the flat portion 54. The plate member 52 is constructed, for example, of steel, and each of the raised portions 56 defines a keyhole shaped slot 58 as best shown in FIG. 4.

The base 50 further includes a foam pad 60 having a coating 62 of suitable adhesive layered upon each of the top and bottom surfaces of the pad 60 for securing the plate member 52 to the ski 22. In order to attach the plate member 52 to the ski 22, the bottom surface of the pad 66 is placed in overlying contact with the top surface 36 of the ski 22 so that the pad 54 firmly adheres to the ski 22, and the plate member 52 is placed in overlying contact with the top surface of the pad 54 so that the platen member 52 firmly adheres to the pad 54. The plate member 52 is thereby affixed to the ski 22 in a stationary relationship therewith and in a relatively permanent fashion.

An advantage provided by the foam pad 60 relates to the adaptability of the base 50 permitting the base 50 to be secured to a ski having a contoured or sloped top surface. More specifically, the flexibility of the foam pad 60 permits the bottom surface of the pad 60 to conform to the contours of the top surface of the ski while the top surface of the pad 60 is maintained in planar condition against the underside of the plate member 52.

As best shown in FIG. 3, each raised portion 54 and foam pad 60 cooperatively define three cavities 64 (only one shown in FIG. 3) so that each raised portion 56 is effectively backed by a corresponding cavity 64. In accordance with the present invention, each cavity 64 is substantially filled by a piece 64 of a resilient elastomeric foam material. As will be explained hereinafter, each cavity 64 and keyhole slot 58 is adapted to accept a protuberance 68 for attaching the base 50 to the remainder of the support means 46. Because each foam material piece 66 has the capacity to collapse when a moderate amount of pressure is applied thereto, each foam material piece 66 accommodates the receipt its corresponding cavity 64 of a protuberance 68. When and if the protuberance 68 is withdrawn from a cavity 64, the memory of the corresponding piece 66 returns the piece 66 to its cavity-filling size.

With reference to FIGS. 3 and 5, the support means 46 includes a connecting mechanism 70 interposed between the roller means 48 and the base 50 for joining the roller means 48 to the base 50. The connecting mechanism 70 includes a bracket section 72 adapted to be affixed to the base 50, a roller-supporting lever section 74 pivotally attached to the bracket section 72, and biasing means 76 hereinafter described. The bracket section 70 includes a platen section 78, a boss portion 80 attached to the platen section 78 so as to extend generally upwardly therefrom, means defining a plurality of protuberances 68, mentioned earlier, and an upwardly-directed projection 82.

As best shown in FIG. 4, the protuberances 68 are provided by shoulder bolts 84 threadably received by threaded apertures in the bottom surface of the platen section 78 so that the heads, indicated 86, of the bolts 84 project downwardly from the bottom of the platen section 78 and are disposed thereacross so that the heads 86 cooperate with the keyhole slots 58 of the base plate member 52 for releasably connecting the connecting mechanism 70 to the base 50. To this end, the shank of each shoulder bolt 84 is slightly smaller in diameter than the width of the narrow region of the opening of the slots 58 yet the head 90 of each bolt 84 is slightly larger than the aforesaid width of the narrow region of the slots 58. In order to connect the connecting mechanism 70 to the base 50, the heads 86 of the shoulder bolts 84 are manipulated through the larger sections of the slots 58 and directed into the narrow sections of the slots 58 so that the bracket 72, and thus the connecting mechanism 70, is releasably interlocked with the base 50 as the raised portions 56 of the base 50 are held between the head 90 of the bolts 84 and the platen section 78.

It follows from the foregoing that the connecting mechanism 70 and roller means 48 can be quickly and easily attached to the base 50 or detached therefrom for use of the ski 22 without the connecting mechanism 70 attached thereto. Inasmuch as the foam pieces 66 (FIG. 4) are adapted to return to their undeformed cavity-filling size upon removal of the shoulder bolt heads 86, the pieces 66 are advantageous in that they substantially close the openings of the keyhole slots 58 and thereby prevent the ingress of snow into the cavities 64 when the connecting mechanism 70 is detached from the base. Hence, the foam pieces 66 prevent a build-up of snow within the cavities 64 while the connecting mechanism 70 is detached from the base 50, which build-up may hinder a subsequent reattachment of the connecting mechanism 70 to the base 50.

With reference again to FIG. 3, the upwardly-extending boss portion 80 of the bracket section 72 defines an aperture therethrough which is oriented generally transversely of the underlying ski 22. As will be apparent hereinafter, the transversely-oriented aperture of the boss portion 80 is used to pivotally attach the lever section 74 to the bracket section 72. Furthermore, the upwardly-directed projection 82 is attached to the platen section 78 at a location thereon positioned forwardly of the boss portion 80. The material out of which the bracket section 72 can be constructed may be any of a number of suitably rigid materials, such as steel or hard plastic, and each of the aforedescribed platen section 78, boss portion 80 and projection 82 of the bracket section 80 can be formed or molded into a single unit.

With reference still to FIG. 3, the lever section 74 includes an effort arm portion 88 and a response arm portion 90. A major part of the lever section 74 is generally elongated and flat and arranged relative to the ski 22 so that its longitudinal axis extends along a path directed generally forwardly and rearwardly of the ski 22. As best shown in FIG. 5, the response arm portion 90 includes two downturned parts 92,94 adjacent the rear end thereof to which the wheel means 66 is operatively attached. To this end, the downturned parts 92 and 94 define aligned openings 96 and 98, respectively, through which the wheel means 48 are journaled.

Disposed generally between the effort and response arm portions 80,90 of the lever section 74 is a pair of generally downwardly-depending flanges 96 (only one shown in FIG. 3) positioned on opposite sides of the boss portion 80 of the bracket section 72. The flanges 96 define openings therethrough which are aligned with the defined openings in the bracket section boss portion 80, and a pivot pin 99 is received by and retained within the aligned openings of the flanges 96 and boss portion 80 to pivotally attach the lever section 74 to the bracket section 80. Furthermore, there is included in the effort arm portion 88 a downwardly-depending projection 94 disposed generally above the upwardly-directed projection 82 of the bracket projection 82 of the bracket section 72.

The biasing means 76, mentioned earlier, of the unit 28 is in the form of a compression spring 100 having opposite ends which are positioned and tightly secured about a corresponding one of projections 82 and 96 for biasing the free end of the response arm portion 90 from an elevated position toward a lowered position as will be described hereinafter.

With reference to FIGS. 3 and 5, the roller means 48 include three vaned wheel portions 102,104 and 106 joined together by means of a single axle 108. Each vaned wheel portion 102,104 or 106 includes a central portion 103, 105 or 107, respectively, defining a substantially elongated cylindrical surface therealong. Furthermore, each vaned wheel portion 102,104 or 106 includes a plurality of vanes 110 joined to the central portion thereof so as to extend radially outwardly therefrom. Each vane 110 terminates in a tip, and the length of each vane 110 as measured between the corresponding cylindrical surface of the central portion and the tip is relatively short in comparison to the diameter of the central portion. Such a vane length has been found to be long enough to ensure rotation of the roller means 48 if the snow is relatively light and fluffy yet short enough to enhance rotation of the roller means 48 if the snow is packed to a relatively hard condition.

In accordance with the present invention, the roller means 48 further includes two serrated wheel portions 109,111 attached to opposite sides of the vaned wheel portions 102 and 106. Each serrated wheel portion 109 or 111 is relatively thin and attached to the outwardmost end of the corresponding vane wheel portion 102 and 106 as shown in FIG. 5. It has been found that the serrated wheel portions 109,111 effectively grasp the underlying snow when the snow is packed to a relatively hard, icy condition in a manner ensuring the accuracy of rotation of the roller means 48 in response to the movement of the roller means 48 over the underlying snow. Thus, it will be understood that the roller means 48 operatively engages and revolves in rolling engagement with the underlying snow whether the underlying snow is relatively soft and fluffy or packed to a hard, icy condition.

With reference still to FIG. 5, the roller means 48 are journalably supported within the support means 46 for rotational movement relative thereto and in a position located generally behind the ski 22. To this end, the axle 108 of the roller means 4B is suitably journaled within the downturned parts 92,94 of the lever section 74 and are arranged in relationship therewith so that part 92 is positioned generally between the vaned wheels 102 and 104 and part 94 is positioned generally between the vaned wheels 104 and 106. Furthermore and as best shown in FIG. 3, the roller means 4B is supported by the lever section 74 so that the rotational axis, indicated 112, of the roller means 48 is oriented generally transversely of the ski 22. Still further and for a reason hereinafter set forth, the overall width of the roller means 48 as measured between the outermost side surfaces, indicated 114,116, of vaned wheels 102 and 106, respectively, is about equal to the width of the ski 22 as measured between its side edges 42 and 44, and the roller means 44 is substantially centered with and behind the ski 22 so that each of the outermost side surfaces 114 or 116 is substantially aligned with a corresponding One of the ski side edges 42 or 44.

In further accordance with the present invention and with reference again to FIG. 5, the vaned wheel 104 includes two sections of vanes 117,119 having ends 121,123, respectively, which are spaced apart and generally face one another and in a direction oriented axially of the wheel 104. For a reason apparent herein, each vane end 123 is coated with a material which is highly reflective to radiant energy, such as light.

with reference again to FIGS. 2 and 3, the ski-mounted unit B further includes cover means 118 providing a cover for the connecting mechanism 70 and roller means 48. The cover means includes a shroud section 120 affixed to the lever section 74 of the connecting mechanism and a front cover section 122 affixed to the ski 22 about the base 50.

Figure 2:
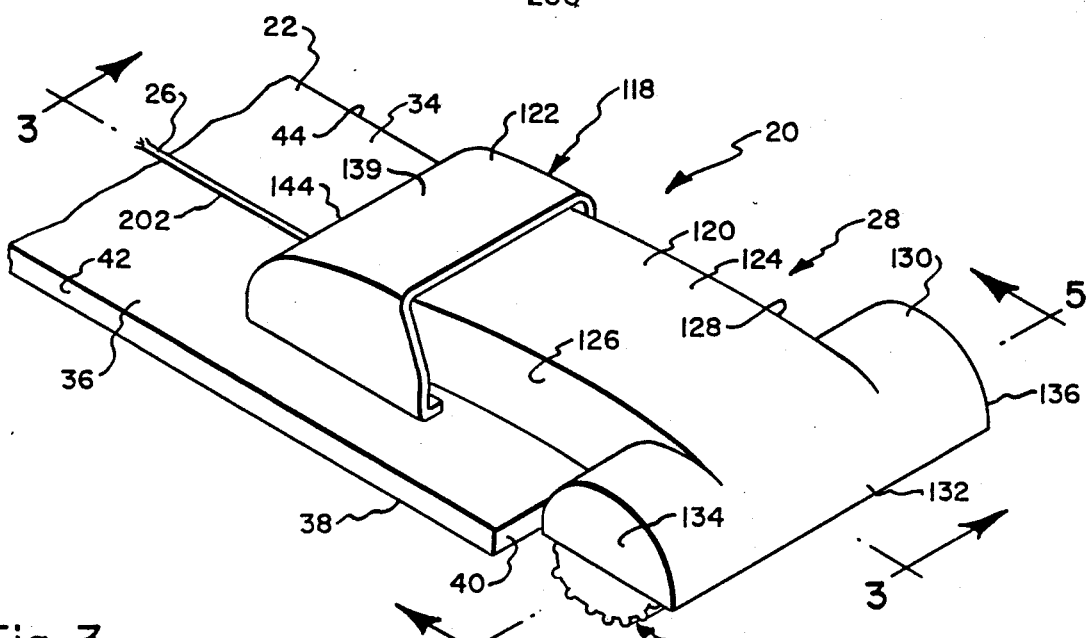
FIG. 2 is a fragmentary perspective view of the ski-mounted componentry of the FIG. 1 device drawn to a slightly larger scale.

The shroud section 120 is somewhat T-shaped in appearance if viewed generally from above in the FIG. 2 view and includes a top 124, two opposite sides 126,128 and a rear portion 130 provided with a back 112 and two opposite sides 134,136. The top 24 and sides 126,128 are adapted to cover the top and sides of the lever section 74, and the rear portion 130 is adapted to cover substantially the upper one-half of the roller means 48. The shroud section 120 is molded from a suitable material, such as a hard plastic, and as best shown in FIG. 3, is affixed to the lever section 74 with screws 138.

The front cover section 122 of the cover means 118 includes a top 139, two opposite sides 140,142, and a front 144. Inwardly-directed flanges 146 are attached to the bottom of the sides 140,142 and front 144 permitting the cover section 122 to be hooked beneath and thereby secured to the connecting member 70. Each of the shroud and cover sections 120 and 122 are preferably constructed of a lightweight, rigid material, such as plastic.

With reference to FIGS. 2 and 3, the outer surfaces of the cover means 118 are substantially streamlined in shape so that the ski-mounted unit 28 contributes little wind resistance to the skier's forward movement. Furthermore, inasmuch as the roller means 48 are intended to rotate in response to the movement of snow beneath and in contact with the roller means 48, the shroud section 120 prevents snow from passing over the top of the roller means 4B in a manner which could otherwise contribute to inaccuracies in measured characteristics of travel.

As best shown in FIG. 3, the ski-mounted unit 28 is attached to the ski 22 in such a relationship with the back edge 40 thereof that the lever section 74 is permitted to pivot relative to the ski 22 and about the pivot pin 99 through a relatively broad range of angular displacement so that the roller means 48 is moveable relative to the ski 22 between elevated and lowered conditions. In the unit 28, the upward pivotal movement of the roller means 48 relative to the ski 22 is limited by the engagement between the top 124 of the front cover section 122, and the downward pivotal movement of the roller means 48 relative to the ski 22 is limited by the engagement between the lower edges of the sides 126,128 of the shroud section 120. In the illustrated embodiment 20, the rotational axis 112 of the wheel 48 can be pivoted between an elevated condition, indicated E in FIG. 3, and lowered condition, indicated L, between an angle B of about twenty degrees.

Inasmuch as the roller means 48 is adapted to revolve about its axle 108 as the vaned wheels 102,104 and 106 move in rolling engagement with the underlying snow S, the unit 28 is advantageous in that the biasing means 76, while biasing the roller means 28 from the elevated condition to the lowered condition L, presses the vaned wheels 102,104 and 106 in engagement with the underlying snow. Such a pressed engagement of the vaned wheels 102,104 and 106 effectively enhances the rolling contact between the roller means 48 and underlying snow S so that characteristics of vaned wheel rotation, such as speed of rotation, about the axle 108 accurately reflect the characteristic of travel, such as speed, of the ski 22 across the snow S.

It follows from the above that the roller means 48 is maintained in operative rolling contact with the underlying snow S when the bottom surface, indicated 152, of the ski 22 lies flatly upon or is moving flatly across the surface of the snow. However, it will also be understood that the roller means 2B is maintained in operative rolling contact with the underlying snow S even if the back edge 40 of the ski 22 is lifted an appreciable distance above the surface of the snow. To this end and as best shown in FIG. 3, when the roller means 48 is positioned in its lowered condition L, the lowermost points of the vaned wheels 102,104 and 106 are positioned a distance D below the lower surface of the ski 22. Because the vaned wheels 102,104 and 106 are continually biased by the biasing means 76, or spring 100, from the elevated condition E toward the lowered condition L, the roller means 48 are maintained in operative rolling contact with the underlying snow even if the back edge 40 of the ski 22 is lifted or elevated from the surface of the underlying snow by a distance D. Hence, the ski-mounted unit 28 is particularly well-suited for use in applications in which the back edges of the skis 22 and 24 bounce or are otherwise occasionally lifted from the surface of the snow.

With reference again to FIG. 5, another advantage of the ski-mounted unit 28 relates to the width and positional relationship of the roller means 48 with respect to the ski 22. More specifically, because the outermost side surfaces 114 and 116 are substantially aligned with the ski side edges 42 and 44, the roller means 48 maintains operative rolling contact with the underlying snow even if the ski 22 is tilted to one side or the other in a manner lifting a substantial portion of the roller means 48 from the snow. If, for example, the ski 22 is tilted upon its side edge 42 so that the ski side edge 44 is elevated from the snow by an appreciable amount, the portion of the vaned wheel 102 adjacent the side surface 114 maintains engagement, and thus rolling contact with, the underlying snow S. Inasmuch as skis are commonly tilted from side to side during relatively routine maneuvers, the ski-mounted unit 28 ensures that the forwardly-directed movement of the ski 22 across snow effects a corresponding rotation of the roller means 48 even if the ski 22 is tilted from side to side during use.

In accordance with the present invention and with reference to FIGS. 5 and 6, the sensing means of the device 20 further includes means, generally indicated 154, supported by the support means 46 for sensing or perceiving the rotation of the roller means 48 and generating signals corresponding to the sensed rotation. Although the perceiving means 154 can take the form of any of a number of suitable perceiving means, the perceiving means 154 in the device 20 is comprised of electronic circuitry 160 including a source 156 of radiant energy and a radiant energy responsive element 158. The radiant energy source 156 includes a light emitting diode 162 for emitting a beam of light and the radiant energy responsive element 158 includes a photodetector 164 for receiving the emitted beam of light.

The perceiving means 154 cooperates with the vanes of the vaned wheel 104 for sensing the relative movement between the ski 22 and the underlying snow. To this end, each vane end 123 of the vane section 119 is coated with a layer of material adapted to reflect the radiant energy emitted by the light emitting diode 162. Furthermore, the light emitting diode 162 and photodetector 162 are mounted in a side-by-side arrangement from the underside of the lower section 70 and between opposing vane ends 121 and 123 of the vane wheel sections 117 and 119. More specifically, each of the light emitting diode 162 and photodetector 162 are oriented in such a relationship to the reflective ends 123 that when any of the reflective vane ends 121 passes before or in front of the light emitting diode 162, at least a portion of the radiant energy emitted therefrom is reflected toward the photodetector 164 for receipt thereby. If the wheel 104 is oriented so that none of its reflective vane ends 121 is positioned in front of the light emitting diode 162, none of the radiant energy emitted from the diode 162 is received by the photodetector 164. It follows that as the wheel 104 is rotated about its axle 108, the receipt of radiant energy by the photodetector 164 is interrupted between each successive pass of a reflective vane end 123 before the light emitting diode 162.

The circuitry 160 also includes appropriate components, as a voltage source and a phototransistor (not shown) through which a voltage drop is established upon each interruption of the receipt of diode-emitted light by the photodetector 164. Hence, the circuitry 160 electrically senses, by means of a change in voltage, each pass of a vane 110 before or in front of the diode 162 and, in turn, senses the revolutions of the roller means 48. for a description of an exemplary circuitry which operates in the manner of circuitry 160 described herein, reference may be had to U.S. Pat. No. 4,206,637.

Figure 7:
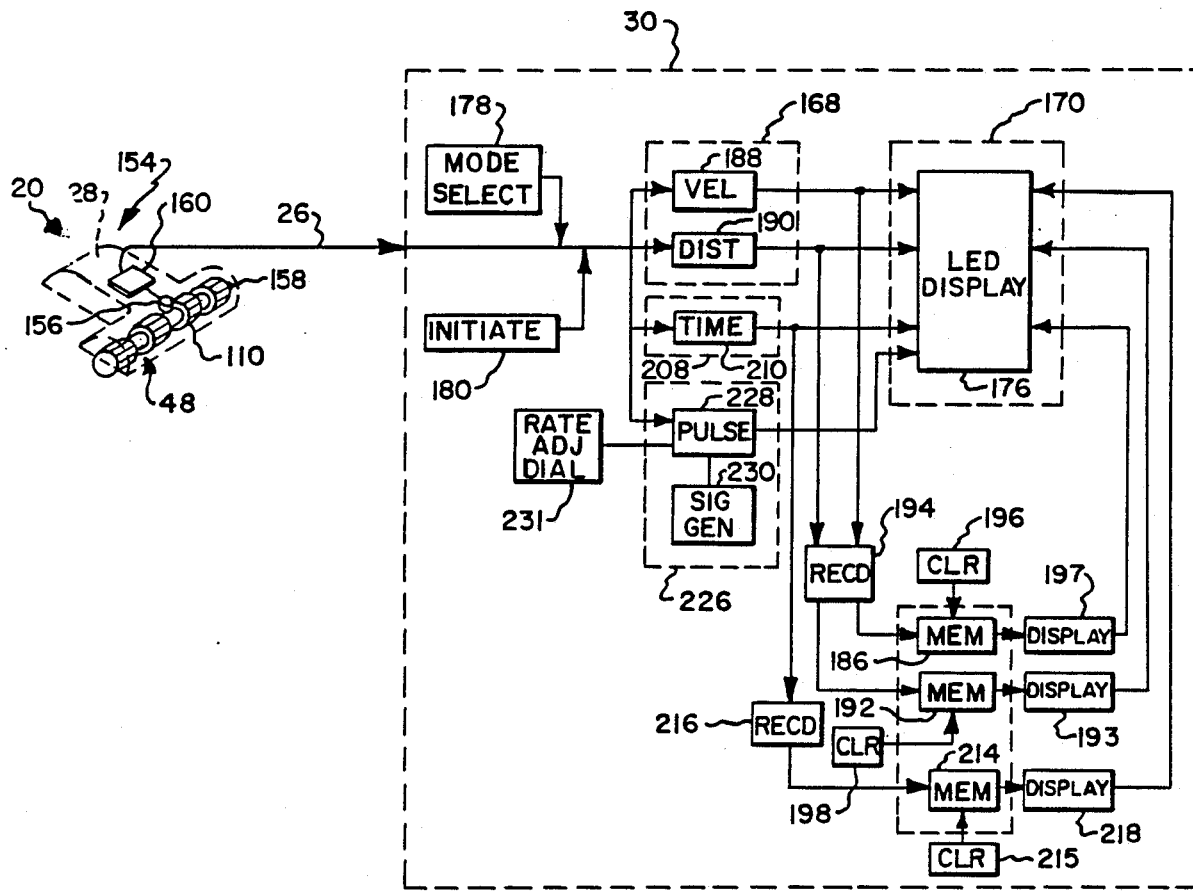
FIG. 7 is a schematic representation illustrating in block diagram form the operation of the FIG. 1 device.

With reference to FIGS. 6 and 7 and in accordance with the present invention, the wrist-mounted unit 30 of the device includes calculator means, indicated 168, for receiving the signals generated by the perceiving means 154 and calculating a predetermined characteristic of travel of the snow ski 22 corresponding to the received signals. The unit 30 further includes means for informing the skier of the calculated characteristic in the form of display means 170 associated with the calculator means 168 for displaying the calculated characteristic. As best shown in FIG. 6, the wrist-mounted unit 30 resembles a wrist watch in appearance including a housing 172 and a band 174 attached to the housing 172 and enabling a skier to attach the housing 172 to his wrist W (FIG. 1). In the illustrated unit 30, the band 174 includes hook and loop type fasteners 173 and 175, respectively, of the type available under the tradename Velcro enabling the skier to quickly attach or detach the unit 30 from his wrist.

The calculator means 168 is mounted in the housing 172 and adapted to calculate characteristics of travel, such as speed or distance, as a function of the sensed rotations of the paddle wheel 104. To this end, the calculator means 108 is operatively wired to the perceiving means 154 through the cable 26 for receiving the variations in voltage generated by the circuitry 160 attending the paddle wheel interruptions of the diode-generated light beam. The calculator means 168 has electronic componentry including speed-calculating components 188 and distance-calculating components 190 of a type which is well known in the art for utilizing the received voltage variations for speed and distance calculations.

Briefly, speed calculations are made by the calculator means 168 as a function of the number of rotations of the roller wheel 104 over a predetermined period of time. Accordingly, the calculator means 16B includes an appropriate timing device for providing predetermined points in time between which the number of roller wheel rotations are counted and a counter for counting the number of wheel rotations. Similarly, distance calculations are made by the calculator means 168 as a function of the number of wheel rotations counted as the ski 22 moves between two points of travel. With knowledge contained within the calculator means 168 of the circumference of the roller wheel 104, or more specifically the circumference of the central portion 105 of the roller wheel 104, the calculator means 108 tallies the distance traveled by the ski 22 by multiplying the circumference of the roller wheel 104 by the number of wheel rotations.

Associated with the calculator means 168 and with reference again to FIG. 7 are memory means 184 having a memory storage capacity for storing preselected ones of the measurements calculated by the calculator means 168. The memory means 184 includes memory chips 186 appropriately connected to the speed-calculating components 188 and which are adapted to automatically record the speed of the skier at a desired instant of time. The memory means 184 also includes memory chips 192 appropriately connected to the distance-calculating components 190 adapted to record various distances desired to be recorded by the user. To this end, a manually-operable switch 194 is mounted on one side of the housing 172 and appropriately associated with the memory means 184 permitting the user to selectively record his speed at any instant of time or various calculated distances at the press of the switch 104. In other words, the depression of the switch 194 will effect a storage in memory of the value displayed by the display means 170 the instant the switch 194 is depressed. Clearing means including clearing switches 196 and 198 are mounted on the housing 172 and are operatively connected with the memory chips 186 and 192 permitting a skier to clear the chips 186 and 192 of information stored therein and in a manner well known in the art. Furthermore, display switches 197 and 199 are connected between the display means 170 and the memory chips 186 and 192 permitting the user to display the stored information.

The memory means 184, by means of the memory chips 192, is also adapted to store the total or accumulated distance traveled by the skier between two points in time. Such a capacity permits the skier to keep a cumulative record of the total distance skied over the period, for example, of one skiing season.

The display means 170 of the wrist-mounted unit includes a light emitting diode (LED) display 176 viewable through the housing 172. The display means 170 is adapted to display the calculated measurement in terms of a numerical rate or distance value such as, for example, miles per hour or feet so that the user readily understands the significance of the displayed value.

In accordance with the present invention and with reference still to FIG. 7, the wrist-mounted unit 30 includes means, indicated 208, for timing the snow skier S as he moves between two points in time. To this end, the timing means 208 includes stop watch components 210 operatively mounted within the housing 172 and associated with the display means 170 in a manner permitting the time measured by the stop watch components 210 to be displayed at the LED display 176. The wrist-mounted unit 30 further includes memory chips 214 associated with he timing means 208 for storing times measured by the timing means 208. A switch 216 mounted on the side of the housing 172 is wired between the memory chips 214 and the stop watch components 210, and the memory chips 214 are adapted to automatically store a timing measurement each time the switch 216 is manually depressed. In particular, the timing measurement stored is the time as measured by the stop watch components 210 between successive depressions of the switch 216. Another switch 218 associated with the memory chips 214 permit the skier to selectively display the stored times. The memory chips 214 are particularly well-suited for use by a racing skier who desires to record the time required to move between successive gates. By depressing the switch 216 as he travels past each gate, his timing between each two successive gates is recorded for subsequent study. Inasmuch as some race courses may have as many as seventy-five gates, the memory chips 214 include a storage capacity for at least seventy-five entries. Clearing means including clearing switch 219 is associated with the memory chips 214 permitting the skier to clear the memory chips 214 of information stored therein.

With reference to FIG. 7, the unit 30 further includes signal-generating means 226 for generating audible signals to the skier at a rate preselected by the skier. In the unit 30, the signal-generating means 226 includes pulse-generating componentry 228 for generating pulses and a sound-emitting device 230 appropriately connected together for emitting an audible sound or signal upon receipt of each pulse generated by the componentry 228. Inasmuch as the signal-generating means 226 is particularly well-suited as a teaching device enabling a skier to develop rhythm of movement, it is preferred that the sound-emitting device 230 be adapted to generate signals of increasing and decreasing volume or switch between successive pulses generated by the pulse-generating componentry 228. Furthermore, the signal-generating means 226 further includes a dial 2 appropriately connected to the pulse-generating componentry 228 permitting the skier to adjust the pulse rate of the componentry 28 and hence the rate at which the audible signals are generated. The signal-generating means 226 is appropriately connected to an LED 226 (FIG. 6) in the LED display 176 for visually indicating to the skier that the unit 30 is set in the signal-generating mode when such is the case.

The unit 30 further includes switch means including a mode select switch 178 permitting the skier to preselect the mode of operation of the device 20 and a initiate switch 180. The mode select switch 178 is in the form of a switch including a digital counter permitting the mode of operation of the device 20 to be selected by depressing the switch a predetermined number of times and are commercially available. For example, and in the device 20, the unit 30 is set to measure speed after one depression of the switch 180, the unit 30 is set to measure distance after two depressions of the switch 180, the unit 30 is set to perform a stop watch function after three depressions of the switch 180, and the unit 30 is set to generate audible signals at a predetermined rate after four depressions of the switch 180.

The initiate switch 180 is connected to the distance-measuring and stop watch componentry of the device 20 enabling the skier to begin his distance or time-measuring operations at zero with a first depression of the switch 180 and enabling the skier to end his distance or time measuring operations with a second depression of the switch 180. Therefore, the initiate switch 180 is essentially a start/stop switch. As best shown in FIG. 6, each of the switches 178 and 80 are relatively large in comparison to the size of the face of the housing 172. Such large switches can be easily manipulated or depressed by a skier wearing gloves.

The device 20 is advantageous in that its wrist-mounted unit 30 and LED display 172 are positionable remote of the roller 48 and, more specifically, are attachable to a skier's wrist so as to be readily viewable by the skier. Inasmuch as the wrists of the skier S are often maintained forwardly of the skier's body while the skier is skiing, as shown in FIG. 1, the wrist-mounted unit 30 attached about the skier's wrist is generally positioned forwardly of the skier's body. Such relationship between the unit 30 and the skier's body permits the skier S to view calculated travel-related damage characteristics at a glance with little or no movement of his eyes from a normally forwardly-directed line of sight. Hence, the device 20 is believed to provide to the skier an indication of travel-related characteristics in a safe and effective manner.

The device 20 is further advantageous in that much of its electronic componentry, including the componentry of the calculator means 168 and the display means 170, are mounted within the housing 172 of the wrist-mounted unit 30. Inasmuch as the skier's wrist W is normally not exposed to the magnitude of the shock's effects to which the skis 22,24 are exposed if the skis 22,24 suddenly strike the ground from an elevated condition, the association of such electronic componentry with the skier's wrist w, rather than the ski 22, is believed to reduce the likelihood of shock-related damage to the componentry and consequently increase the useful life of the device 20.

With reference again to FIG. 1 and in accordance with the present invention, the device 20 includes means, indicated 200, associated with the perceiving means 154 for sending the signals generated thereby to the calculator means 168. In the device 20, the sending means 120 is provided by the cable 26. As best shown in FIG. 1, the cable 16 includes a ski-spanning section 202 extending from the ski-mounted unit 28 and terminating in a plug 204 positionable adjacent the heel of the skier's boot. The cable 26 further includes a body-spanning section 206 extending from the wrist-mounted unit 30 and terminating in a plug receptacle 207 positionable adjacent the heel of the skier's boot. The body-spanning section 206 may be worn inside or outside of the skier's clothing.

The plug 204 and receptacle 207 are adapted to releasably connect with one another to electrically join the cable sections 202 and 206 and to permit the cable sections 202 and 206 to become detached if force ably pulled apart. Inasmuch as a skier commonly looses a ski if he falls down while skiing, the capacity of the plug 204 and receptacle 207 to become detached when pulled apart prevents damage to the cable 26 if the skier looses his ski 22.

Figure 8:
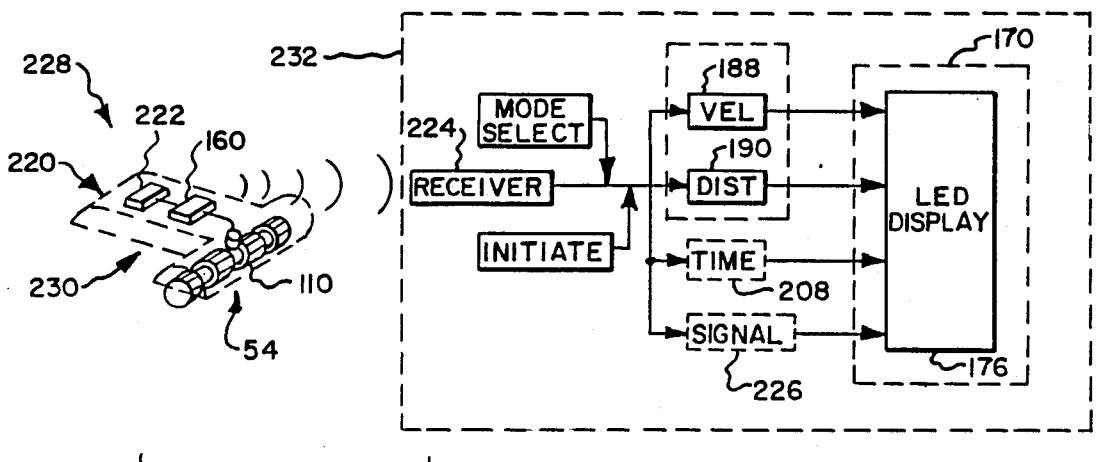
FIG. 8 is a view similar to that of FIG. 7 illustrating the operation of an alternative embodiment of a device in accordance with the present invention.

It will be understood that numerous modifications and substitutions can be had to the aforedescribed embodiment without departing from the spirit of the invention. For example, although the aforementioned embodiment 20 has been shown and described as including a cable 26 for sending the signals generated by the sensing means 154 to the calculator means 168, alternative means may be provided. For example, there is depicted in FIG. 8 a device 228 in accordance with the present invention including radiotelemetry means, indicated 220, for transmitting the signals generated by the sensing means 154 to the calculator means 168. Such radiotelemetry means 220 includes a transmitter 222 mounted within the ski-mounted unit, indicated 230, of the device 228 and a receiver 224 mounted within the wrist-mounted unit, indicated 232, of the device 228. The transmitter 222 is operatively connected to the sensing means 154 for receiving the signals generated thereby and is adapted to transmit the received signals to the transmitter 222 by radio waves. The transmitter 222 is, in turn, adapted to receive the transmitted radio wave signals and forward them to the calculator means 168 for calculation purposes. Other components of the device 22B which correspond to those of the device 20 of FIGS. 1-7 accordingly bear the same reference numerals.

Still further, although the aforedescribed embodiment 20 has been shown and described for utilization by a skier riding snow skis across snow, an embodiment in accordance with the present invention can be utilized by other types of riders moving across a relatively immovable surface. For example, a device in accordance with the present invention can be utilized by a rider of a sled as he sleds across snow and ice. The sensing means for sensing the movement between the sled and the underlying surface in such a device would be attachable to the runner of the sled. Accordingly, the aforedescribed embodiment is intended for purposes of illustration and not as limitation.

We claim:

1. A measuring and indicating device for use by the rider of a vehicle such as a ski or the like which slides across an underlying surface in a forward direction; said device comprising:
    support means adapted to be attached to the vehicle of the rider, said support means including a connecting mechanism pivotally joining a portion of said support means to the vehicle for pivotal movement of said portion of the support means about a horizontal axis transverse to the forward direction;
    roller means connected to said portion of the support means for rotational movement relative thereto and supported thereby so that when the support means is operatively attached to the vehicle and the vehicle is moved across the underling surface the roller means will rotate in rolling engagement with the surface;
    biasing means acting through the connecting mechanism for biasing the roller means from a raised condition to a lowered condition to maintain the roller means in engagement with the underlying surface when the vehicle is in contact therewith;
    signal generating means supported by the support means adjacent the roller means for sensing the rotation thereof and generating signals corresponding to the sensed rotation; and
    an indicator unit including calculator means for receiving the signals generated by the signal generating means and calculating a predetermined characteristic of travel of the vehicle corresponding to the received signals, the indicator means also including display means associated with the calculator means for informing the rider of the calculated characteristic.

2. A measuring and indicating device for use by the rider of a vehicle such as a ski or the like which slides across an underlying surface in a forward direction; said device comprising:
    support means adapted to be attached to the vehicle of the rider;
    roller means connected to the support means for rotational movement relative thereto and supported thereby so that when the support means is operatively attached to the vehicle and the vehicle is moved in a forward direction across the underlying surface, the roller means will rotate in rolling engagement with the surface;
    signal generating means supported by the support means adjacent the roller means for sensing the rotation thereof and generating signals corresponding to the sensed rotation;
    sending means associated with the signal generating means for sending the signals generated thereby;
    an indicator unit including calculator means for receiving the signals sent by the sending means and calculating a predetermined characteristic of travel of the vehicle corresponding to the received signals, the indicator means further including display means associated with the calculator means for informing the rider of the calculated characteristic; and
    biasing means between the vehicle and the support means for biasing the roller means into engagement with the underlying surface when the vehicle is in contact therewith to enhance the rolling engagement between the underlying surface and the roller means as the roller means is moved across the underlying surface;
    wherein said support means includes the bracket member being mounted on the vehicle, the roller means being journalled within said level member for rotation relative thereto, and said lever member being pivotally attached to the bracket member for pivotal movement of said lever member and roller means between a raised position in relation to the vehicle and a lowered position in relation to the vehicle, and wherein said biasing means is associated with said bracket member and said lever member for biasing the roller means from the raised position to the lowered position so that if the vehicle is raised or lowered between a position at which the vehicle is in contact with the underlying surface and a elevated position above the underlying surface, the roller means maintains the rolling contact with the underlying surface.

3. A device as defined in claim 2 wherein said biasing means includes a spring interposed between said lever member and said bracket member.

4. A device as defined in claim 2 wherein said lever member cooperates with the bracket member to permit the roller means to be pivoted between said raised and lowered conditions through a relatively broad range of angular displacement for maintaining rolling contact of the roller means with the underlying surface even though the vehicle may be elevated from the underlying surface by an appreciable amount.

5. The device as defined in claim 4 wherein the lever member is pivotable relative to the vehicle through an angular displacement of about twenty degrees.

6. A device as defined in claim 2 wherein said roller means includes a vaned wheel having a plurality of vanes and said signal generating means includes a source of radiant energy for emitting radiant energy and a radiant energy responsive element for receiving radiant energy emitted by said radiant energy source, said source of radiant energy being supported by said support means adjacent said vaned wheel and co-operable with said vaned wheel so that the rotation of said vaned wheel relative to said source of radiant energy effects an interruption in the receipt of radiant energy by said radiant energy responsive element, and said radiant energy responsive element generating a signal in response to the vaned wheel interruptions of the receipt of radiant energy by said responsive element.

7. A device as defined in claim 6 wherein the vanes of said vaned wheel include a surface which is reflective to radiant energy, and said source of said radiant energy and said radiant energy responsive element are mounted in such a relationship to the vanes of said vaned wheel so that as said vaned wheel is rotated, the reflective surface of the vanes thereof reflect radiant energy emitted from said radiant enery source to said radiant energy responsive element in an intermittent manner.

8. A device as defined in claim 6 wherein said source of radiant energy and said radiant energy responsive element are supported by said support means in a side-by-side arrangement.

9. A device as defined in claim 6 wherein said radiant energy source includes a light emitting diode, said radiant energy responsible element includes a photodetector.

10. A measuring and indicating device for use with a snow ski having a back and opposite left and right side edges; said device comprising:
support means adapted to be attached to the ski, a rear portion of the support means being capable of vertical movement relative to the ski;
roller means connected to the rear portion of the support means for rotational movement relative thereto and supported thereby so that when the support means is operatively attached to the ski and the ski is moved in a forward direction across snow the roller means will rotate in rolling engagement with the snow, and wherein said roller means is supported by said support means so as to be positioned behind the ski and includes two outermost side surfaces which are each generally aligned with a corresponding one of the left and right side edges of the ski when the back of the ski is viewed from the rear so that the roller means maintains operative rolling contact with the underlying snow even though the ski is tilted upon one of its sides by an appreciable amount;
biasing means between the ski and the support means for biasing the roller means into engagement with snow when the ski is in contact therewith to enhance the engagement between the snow and the roller means as the roller means is moved across the snow; and
an indicator unit including display means associated with the roller means for informing the skier of a predetermined characteristic of travel.

11. A device as defined in claim 10 wherein said roller means includes a vaned wheel portion defining an elongated cylindrical surface and a plurality of vanes joined so as to extend radially outwardly from said cylindrical surface, and wherein said roller means further includes a serrated wheel portion defining a serrated circumference and the maximum diameter of said serrated wheel portion is about equal to the maximum diameter of said vaned wheel portion.

12. A device as defined in claim 10 wherein shroud means are provided which overlie the top and front portions of said roller means.

13. The device as set forth in claim 12 wherein further shroud means are provided to overlie the forward portion of the support means.

14. A measuring and indicating device for use by the rider of a vehicle such as a snow skier or the like which slides across an underlying surface in a forward direction; said device comprising:
support means adapted to be attached to the vehicle of the rider;
sensing means associated with the support means for sensing relative movement between the vehicle and the underlying surface the sensing means including roller means connected to the support means for rotation or movement relative thereto and supported by the support means so that when the support means is operatively attached to the vehicle and the vehicle is moved across the surface, the roller means rotates in rolling engagement with the surface, the sensing means further including means supported by the support means for sensing the rotation thereof and generating signals corresponding to the sensed rotation;
an indicator unit associated with the sensing means and supported by the body of the rider at a location remote of the sensing means, the indicator unit including calculator means for receiving the signals generated by the sensing means and calculating a predetermined characteristic of travel of the vehicle corresponding to the received signals and informing means associated with the calculator means for informing the rider of the calculated characteristic; and
means associated with the sensing means for sending the signals generated thereby to the calculator means.

15. A device as defined in claim 14 further comprising memory means associated with the calculator means for storing the speed of the rider for both a desired instance of time and also for various distances desired to be recorded by the rider, and means engagable by the rider while the vehicle is traversing the underlying surface for initiating the operation of the memory means.

16. A device as defined in claim 14 for use by a rider wherein said indicator unit is adapted to be attached to the wrist of the rider.

17. A device and defined in claim 14 wherein said sending means includes radiotelemetry means for transmitting the signals generated by the sensing means to the calculator means, said radiotelemetry means including a transmitter operatively associated with the sensing means for generating and sending radio signals corresponding to the sensed movement between the vehicle and the underlying surface and a receiver operatively associated with the calculator means for receiving the signals sent by the transmitter.

18. A measuring and indicating device for use by the rider of a vehicle such as a ski or the like which slides across an underlying surface in a forward direction; said device comprising:

support means including a base adapted to be adhesively affixed to the vehicle in a stationary relationship therewith, said base including means defining at least one detent defining means, and a connecting mechanism co-operable with said detent defining means to releasably interconnect the connecting mechanism to the base, the connecting mechanism including a protuberance, and the detent defining means including a plate-like portion defining a slot and means defining a cavity backing said slot, said protuberance being co-operable with said detent defining means for connecting the connecting mechanism to the base when the protuberance as inserted within said slot so as to be accepted by said cavity;

roller means connected to the support means for rotation or movement relative thereto and supported thereby so that when the support means is operatively attached to the vehicle and the vehicle is moved across the underlying surface the roller means will rotate in rolling engagement with the surface;

signal generating means for sensing the rotation of the roller means and generating signals corresponding to the sensed rotation; and an indicator unit associated with the roller means and including calculator means for receiving the signals and calculating a predetermined characteristic of travel of the vehicle, the indicator means further including display means associated with the calculator means for informing the rider of the calculated characteristic.

19. A device as defined in claim 18 wherein the base includes means for substantially closing said slot when said protuberance is disconnected from said detent-defining means for preventing the acceptance of snow by the cavity when the connecting mechanism is detached from the base.

20. A device as defined in claim 19 wherein the base includes an amount of elastomeric resilient foam material positioned with said cavity and which is compressible to a collapsed condition by said protuberance when inserted within said slot and which is expandable to an expanded condition at which said material substantially fills said cavity and thereby closes said slot when said protuberance is withdrawn from said slot.

21. A measuring and indicating device for use by the rider of a vehicle such as a snow ski or the like which slides across an underlying surface in a forward direction; said device comprising:

support means adapted to be attached to the vehicle of the rider;

sensing means associated with the support means for sensing relative movement between the vehicle and the underlying surface and generating signals corresponding to the sensed movement;

an indicator unit associated with said sensing means and supported by the body of the rider at a location remote from the sensing means, the indicator unit including calculator means for receiving the signals generated by the sensing means and calculating a predetermined characteristic of travel of the vehicle corresponding to the received signals, and informing means associated with the calculator means for informing the rider of the calculated characteristic, the indicator unit further including signal-generating means for generating audible signals to the rider at a predetermined rate, and means permitting the rider to select said predetermined rate; and means associated with the sensing means for sending the signals generated thereby to the calculator means.

22. A measuring and indicating device for use by a skier who rides upon a ski which slides across an underlying surface in a forward direction; said device comprising:

support means adapted to be attached to the ski of the skier;

sensing means associated with the support means for sensing relative movement between the ski and the underlying surface and generating signals corresponding to the sensed movement;

an indicator unit associated with said sensing means and supported by the body of the skier at a location remote from the sensing means, the indicator unit including calculator means for receiving the signals generated by the sensing means and calculating a predetermined characteristic of travel of the ski corresponding to the received signals, and informing means associated with the calculator means for informing the skier of the calculated characteristic; and sending means associated with the sensing means for sending the signals generated thereby to the calculator means, the sending means including a cable operatively connected between the sensing means and the indicator unit to which signals generated by said sensing means are transmitted to the calculator means, the cable including a ski-spanning section for extending from the sensing means to a location on the skier's ski adjacent the skier's foot and a body-spanning section for extending from the indicator unit when attached to the wrist of the skier to a location on the skier's ski adjacent the skier's foot, each of said ski-spanning section and body-spanning section terminating in a corresponding plug or receptacle, said plug and receptacle adapted to be attached to one another to operatively join said ski-spanning and body-spanning sections and adapted to be detected from one another if pulled apart so that said ski-spanning and body-spanning sections are permitted to become detached if the ski becomes detached from the skier.

* * * * *

UNITED STATES PATENT AND TRADEMARK OFFICE
CERTIFICATE OF CORRECTION

PATENT NO. : 4,860,585

DATED : August 29, 1989

INVENTOR(S) : William W. Tuyn

It is certified that error appears in the above-identified patent and that said Letters Patent is hereby corrected as shown below:

Column 14, line 47, (claim 2) change "level" to --lever--.

Signed and Sealed this

Seventh Day of April, 1992

Attest:

HARRY F. MANBECK, JR.

*Attesting Officer*     *Commissioner of Patents and Trademarks*